United States Patent
Hunsinger et al.

(10) Patent No.: US 6,507,691 B1
(45) Date of Patent: Jan. 14, 2003

(54) FIBER OPTIC SPLICE ORGANIZER WITH SPLICING TRAY AND ASSOCIATED METHOD

(75) Inventors: Terrance D. Hunsinger, Raleigh, NC (US); Timothy A. Greenlee, Moncure, NC (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 09/273,882

(22) Filed: Mar. 22, 1999

(51) Int. Cl.[7] .................................................. G02B 6/36
(52) U.S. Cl. ........................ 385/135; 385/136; 385/137
(58) Field of Search ................................. 385/135–137

(56) References Cited

U.S. PATENT DOCUMENTS

| | | |
|---|---|---|
| 4,373,776 A | 2/1983 | Purdy |
| 4,595,255 A | 6/1986 | Bhatt et al. |
| 4,679,896 A | 7/1987 | Krafcik et al. |
| 4,722,585 A | 2/1988 | Boyer |
| 4,765,708 A | 8/1988 | Becker et al. |
| 4,765,709 A | 8/1988 | Suillerot et al. |
| 4,805,979 A * | 2/1989 | Bossard et al. ............ 350/96.2 |
| 4,900,121 A | 2/1990 | Becker et al. |
| 5,131,066 A | 7/1992 | Foss |
| 5,278,933 A | 1/1994 | Hunsinger et al. |
| 5,323,478 A * | 6/1994 | Milanowski et al. ....... 385/135 |
| 5,323,480 A * | 6/1994 | Mullaney et al. ........... 385/135 |
| 5,353,367 A | 10/1994 | Czosnowski et al. ....... 385/135 |
| 5,590,234 A * | 12/1996 | Pulido ........................ 385/135 |
| 5,647,045 A | 7/1997 | Robinson et al. ........... 385/135 |
| 5,689,606 A | 11/1997 | Hassan |
| 5,703,990 A | 12/1997 | Robertson et al. |
| 5,802,237 A | 9/1998 | Pulido |
| 6,192,180 B1 * | 2/2001 | Kim et al. .................. 385/135 |
| 6,249,632 B1 * | 6/2001 | Wittmeier, II et al. ...... 385/135 |

FOREIGN PATENT DOCUMENTS

| | | | | |
|---|---|---|---|---|
| EP | 0 490 644 A1 | 12/1991 | ............ | G02B/6/44 |
| GB | 2 300 491 A | 11/1996 | ............ | G02B/6/36 |

* cited by examiner

*Primary Examiner*—Frank G. Font
*Assistant Examiner*—Michael P. Mooney
(74) *Attorney, Agent, or Firm*—Allen, Dyer, Doppelt, Milbrath & Gilchrist, P.A.

(57) ABSTRACT

A fiber optic splice organizer secures a plurality of optical fiber splices between first and second optical fiber groups and secures slack associated therewith. The organizer includes a generally longitudinally extending lower base member that has lengthwise extending first and second opposing sides and widthwise extending first and second opposing ends. Slack optical fibers can be stored in looped configuration on the lower base member. A hinge is connected at one end and is adapted to pivotally mount the lower base member to a housing of a fiber optic splice closure. A member is positioned at the pivotally connected end of the base member for receiving groups of optical fibers. An upper splicing tray is positioned on the lower base member and at least one splice holder is positioned on the upper splicing tray for securing a plurality of fiber optic splices in side-by-side relation.

38 Claims, 4 Drawing Sheets

FIBER OPTIC SPLICE ORGANIZER WITH SPLICING TRAY AND ASSOCIATED METHOD

FIELD OF THE INVENTION

This invention relates to the field of fiber optics and, more particularly, to the storage and organization of fiber optic splices and associated slack.

BACKGROUND OF THE INVENTION

Optical fiber communications systems are used extensively in the telecommunications industry because of their large information carrying capacity, their virtually noise-free performance, and the long span distances achievable with optical fibers before regeneration and amplification of the signal is required. Practical limits on the lengths of optical fiber cables that can be manufactured and installed typically require that many splice points be included over the total cable route.

At each splice location, the optical fibers are separated from the other protective cable components for splicing and are, thus, more susceptible to damage. In addition, the optical fibers at a splice point are handled by a technician who must splice the fibers and then store the splice and associated slack in a protective enclosure.

Although an optical fiber cable can carry signals over relatively long distances without requiring repeaters, one common architecture includes one or more drop locations along a main cable route. In other words, it may be desirable to connect certain fibers to drop cables along the main cable route. Each such drop or splice point requires the protection of the cable ends and individual splices. More particularly, a splice closure is typically provided for terminating the cables and storing the splices.

Accordingly, enclosures for protecting optical fiber splices have been developed and are readily available. Typically, these enclosures include one or more splice organizers, or splice trays as they are also called, on which the individual splices and associated slack are mounted. For example, the assignee of the present invention manufacturers a conventional splice enclosure and splice organizer under the model designation FOSC 100. Siecor Corporation of Hickory, N.C. makes splice enclosures under the model designations SC2 and SC4-6.

U.S. Pat. No. 4,679,896 to Krafcik, for example, discloses a butt splice closure where the ends of two cables to be spliced together are routed through one end plate of a generally cylindrical housing. The housing is provided by a pair of generally circular end plates, and a tubular cover connecting the two end plates. Raychem, the assignee of the present invention, also manufactures butt splice closures wherein the cables to be spliced are brought in from a single end of the housing. A series of pivotally mounted splice organizers are provided. The pivotally connected splice organizers permit organizers to be moved to a raised position to facilitate access to an underlying organizer. A fixed slack basket may be positioned under the splice organizers to store slack buffer tubes, for example. An example includes U.S. Pat. No. 5,323,480 to Mullaney et al., the disclosure which is hereby incorporated by reference in its entirety, assigned to the present assignee, the disclosure which is hereby incorporated by reference in its entirety.

Another general type of splice closure is the in-line closure wherein cables enter the overall housing from opposing ends. An in-line splice closure may be particularly desirable for a drop or branch cable location where the main cable includes a significant number of fibers that can pass through the closure without requiring splicing. Only those fibers that need to be dropped are spliced and the remaining fibers can be stored within the housing.

For example, U.S. Pat. No. 4,805,979 to Bossard et al. discloses such an in-line fiber optic splice closure. The closure includes two mating shell portions which are secured together to define an overall protective housing. Cable entry ports are provided at each end of the housing and are defined by arcuate wall portions between the base and cover housing portions. A slack storage area is defined in the base by a pair of inwardly extending retaining brackets connected at a medial portion of the base. The cable ends are terminated adjacent the cable ports. A series of splice organizers are connected to the base above the slack storage area. Each splice organizer stores a number of individual fiber splices.

A splice organizer is typically limited in the amount of space it may occupy although it must permit the mounting of the individual splices and permit storage of the slack optical fibers in a relatively neat configuration. To hold a sufficient amount of slack to permit splicing, a splice organizer typically accommodates one or more bends of slack optical fiber in slack loops that cannot be sharply bent and thereby exceed the minimum bend radius for the optical fiber. Exceeding the bend radius causes microbending losses, that is, increased attenuation of the optical signal. In addition, the optical fibers may be physically damaged by exceeding the minimum bend radius. An approach to storing a sufficient length of slack is to use multiple loops for each individual fiber. See, for example, U.S. Pat. No. 4,373,776 to Purdy and U.S. Pat. No. 4,765,709 to Suillerot et al.

The slack loops of conventional splice organizers are frequently permanently entangled with each other as part of the normal course of splicing and routing of the slack for storage on the splice organizer. Unfortunately, it is very difficult to access an individual splice after all of the splices have been completed because of the entangling of the slack optical fibers. In almost all fiber optic communications systems, it is critical that high quality and high reliability splices be obtained. Fusion and mechanical splicing techniques and equipment have been developed that permit low loss, high quality, and durable splices to be obtained. However, it may sometimes be necessary to remake or repair splices to achieve the desired splice quality. The inability to readily reaccess a splice, such as to remake the splice, is a significant shortcoming of conventional fiber optic splice organizers.

Fiber cables are also available of a ribbon type, such as manufactured by AT&T, wherein several optical fibers are arranged in side-by-side relation and secured together by an adhesive layer. However, another difficulty with conventional splice organizers and techniques is that organizers for ribbon-type fiber optic cables require that every fiber in a given ribbon be spliced to every correspondingly positioned fiber of another fiber optic ribbon. Thus, any flexibility in interconnecting a predetermined individual optical fiber to an optical fiber in a different position or on a different ribbon is simply not available. Moreover, should it be necessary to repair only a single optical fiber splice of the ribbon, all of the splices must then be broken and remade. Thus, unnecessary communications systems downtime is experienced because of the need to work with all of the fibers in the ribbon, rather than being able to efficiently access only one optical fiber from the ribbon.

In many new fiber optic communications applications, such as in campus-type networks or cable TV networks, high fiber counts and a large number of drop points are required. Unfortunately, since conventional fiber optic organizers cannot accommodate splices between individual optical fibers when ribbon cables are used, interconnection flexibility for such a system is severely limited.

U.S. Pat. No. 5,278,933 to Huntsinger et al., issued Jan. 11, 1994, the disclosure which is hereby incorporated by reference in its entirety, provides a splice organizer and method for securing optical fiber splices and slack of the cables, which also permits ready separation of the optical fibers even after all the splicing has been completed, such as to facilitate remaking the splice. It also allows break out and splicing of individual optical fibers in the ribbons to enhance interconnection flexibility and permit the repair of individual optical fibers from an optical fiber ribbon.

In this structure, the fiber optic splice organizer includes a generally rectangular base. A splice securing structure is positioned on a medial portion of the base between the first and second sides and adjacent the first end of the base for securing a plurality of optical fiber splices on the base. A slack guide structure is positioned on the base for guiding slack portions of laterally spaced apart first and second optical fiber groups from the first end of the base and along respective portions of the base adjacent the first and second sides. The slack guide structure guides the slack into a plurality of respective first and second slack loops overlying each other adjacent the second end of the base and back to the splice securing structure from respective first and second sides of the base so that the overlying respective slack groups of the first and second optical fiber groups are readily separable from each other.

U.S. Pat. No. 5,802,237 to Pulido, issued Sep. 1, 1998, discloses an optical fiber organizer having first and second levels formed as elliptical structures where both mechanical and fusion splice devices are held on each level. Each level also includes a first fiber port and a second fiber port. Thus, splices and entry of fiber occurs on both levels. However, it would be advantageous if slack storage was separate from splicing and initial guiding of fiber and any splice storage allowed the separation of one side of the splice from the other. Also other structures as disclosed above typically have a separate splice tray and slack storage tray, thus making it difficult to organize and identify fibers and ribbons.

SUMMARY OF THE INVENTION

It is therefore an object of the present invention to provide a fiber optic splice organizer where the optical splices and slack are separate but on one organizer and entry points for the fibers and the slack area are separate from the splice area.

The present invention now allows adequate separation of the splices on a different structure from the slack, and permits the slack storage to be removed, while still having the separation from one side to the other. The invention allows one to splice on one level (upper) of the tray and store splice slack as well as uncut fiber storage on another level. This allows separation of the splices and slack storage on the same organizer as well as separating ribbon or fiber groups from other ribbon or fiber groups in the same closure. The splice storage allows one to separate one side of the splice from the other. This capability is significant for resplicing live working fibers. The organizer allows one to separate and break out a ribbon fiber to splice a single fiber. The organizer allows one to easily splice and store fibers/ribbons on the same organizer. It gives a good separation between the splices and fiber storage. Other organizer systems have separate splice trays and slack storage trays. This makes it difficult to organize and identify fibers/ribbons. Separate groups of fibers/ribbons can be spliced and stored on the same splice organizer. The organizer is compatible with both in-line and butt joints. Additionally, the slack can be placed in an area separate from the splice connections to allow one to work on the splice connections without interference from any slack cable or ribbon.

In accordance with the present invention, a fiber optic splice organizer secures a plurality of optical fiber splices between first and second optical fiber groups and secures the slack associated therewith. A generally longitudinally extending lower base member has lengthwise extending first and second opposing sides and widthwise extending first and second opposing ends on which slack optical fibers can be stored in looped configuration. Naturally, the optical fibers in the following description can refer to ribbons.

A hinge is connected at one end and adapted to pivotally mount the base member to the housing. Means is positioned at the end of the base member to be pivotably mounted for receiving optical fibers. An upper splicing tray is positioned on the lower base member and at least one splice holder is positioned on the upper splicing tray for securing a plurality of fiber optic splices in side-by-side relation. The slack is then placed under the upper splicing tray within the area formed between the upper splicing tray and the lower base member.

In one aspect of the present invention, the fiber optic splice organizer includes a guide for receiving and guiding optical fibers. The guide could include an arcuate member that allows the optical fibers to extend arcuately around the interior lower base member adjacent a pair of opposing side walls extending upwardly from the lower base member, such that the walls retain slack portions of optical fibers adjacent thereto.

Guide tabs extend from the sidewalls to aid in retaining slack portions of optical fibers within the lower base member. The upper splicing tray can include a locking member that permits the upper splicing tray to snap fit onto the lower base member. The upper splicing tray is typically substantially rectangular configured and is secured to the lower base member at the end opposite the pivotal mount. The upper splicing tray can also be secured to the lower base member at a medial portion of the lower base member. The splice holders can also be adapted for splicing ribbon fiber optical fiber and can be adapted for in-line splicing and butt splicing.

In still another aspect of the present invention, a fiber optic splice closure of the present invention includes a housing and means positioned on the housing for securing one or more fiber optic cables to the housing. A plurality of fiber optic splice organizers secure a plurality of optical fiber splices between first and second optical fiber groups and secures the slack associated therewith. The fiber optic splice organizers are positioned within the housing and have an end pivotally connected to the housing and moveable between a stacked position and a raised position to facilitate access to the underlying area of the organizer, such as where other stacked fiber optic splice organizers are positioned.

Each fiber optic splice organizer further comprises a generally longitudinally extending lower base member that has lengthwise extending first and second opposing sides and widthwise extending first and second opposing ends in which slack optical fibers can be stored in looped configuration. A hinge is connected at one end that pivotally connects the base member to the housing. Means is positioned at the pivotally connected end of the base member for receiving optical fibers. An upper splicing tray is positioned on the lower base member. At least one splice holder is positioned on the upper splicing tray for securing a plurality of fiber optic splices in side-by-side relation. The housing is generally cylindrically configured and cable termination means can be connected to the housing for securing one or more fiber optic cables thereto.

In a method aspect of the present invention, the method organizes a plurality of optical fiber splices between first and second optical fiber groups and the slack associated therewith. A lower base member having lengthwise extending first and second opposing sides is provided. It also has opposing sidewalls extending upwardly from the base, and widthwise extending first and second opposing ends. The method comprises the step of securing optical fiber splices that exist between first and second optical fiber groups on splice holders that are positioned on a medial portion of an upper splicing tray, which is secured to the lower base member. The method also comprises the step of coiling the slack optical fibers, inserting a portion of the coiled slack optical fibers under the upper splicing tray, and guiding the slack optical fibers that have not been inserted under the upper splicing tray along respective portions of the lower base member adjacent the upwardly extending walls of the first and second sides.

In still another method aspect of the present invention, the method comprises the step of securing the slack optical fibers under guide tabs that extend from the sidewalls across a portion of the lower base member. The method also comprises the step of coiling the slack optical fibers into a figure eight loop. The method also comprises the step of mounting the splice holder adjacent the first end of the lower base member and securing the first and second optical fiber groups in laterally spaced apart relation on the lower base member adjacent the first end of the lower base member prior to splicing.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
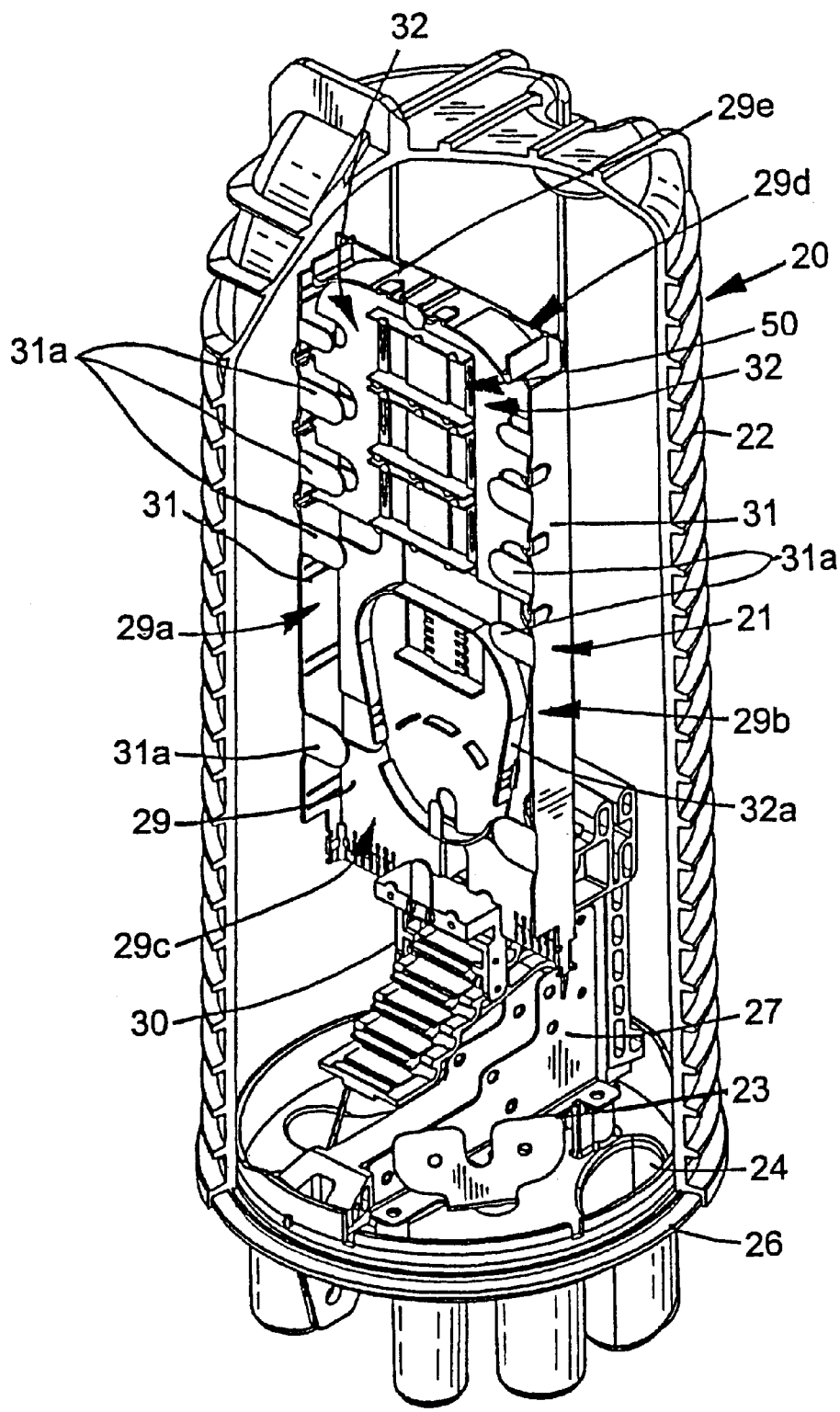
FIG. 1 is a fragmentary perspective view of a fiber optic splice organizer of the present invention positioned within a fiber optic butt splice enclosure.
Figure 2:
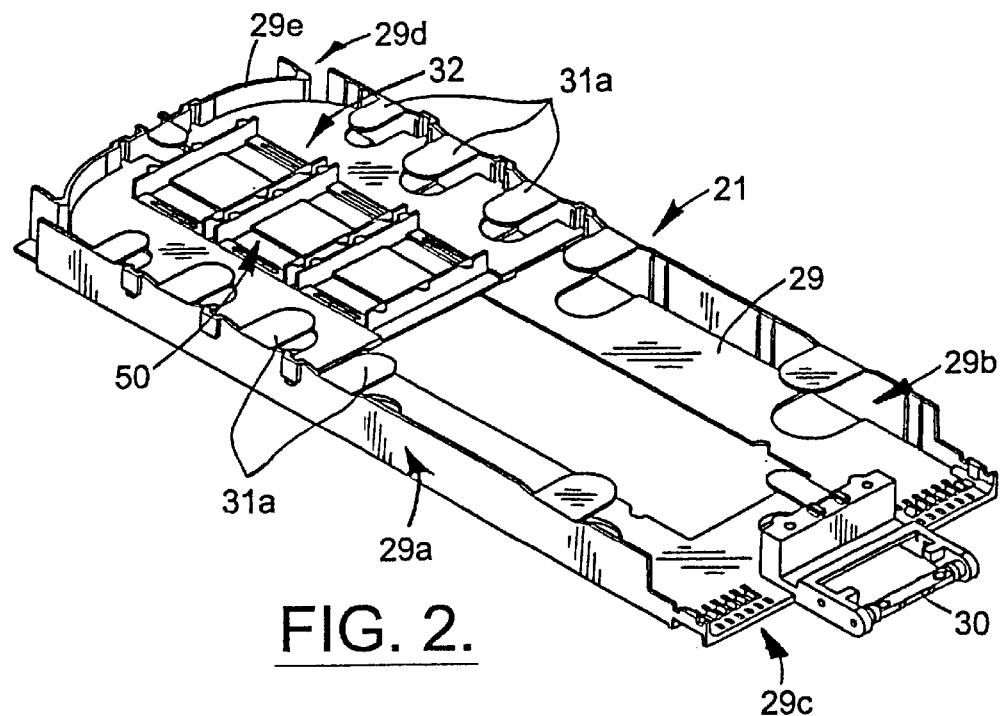
FIG. 2 is a top perspective view of a fiber optic splice organizer of the present invention without a separator wall.
Figure 3:
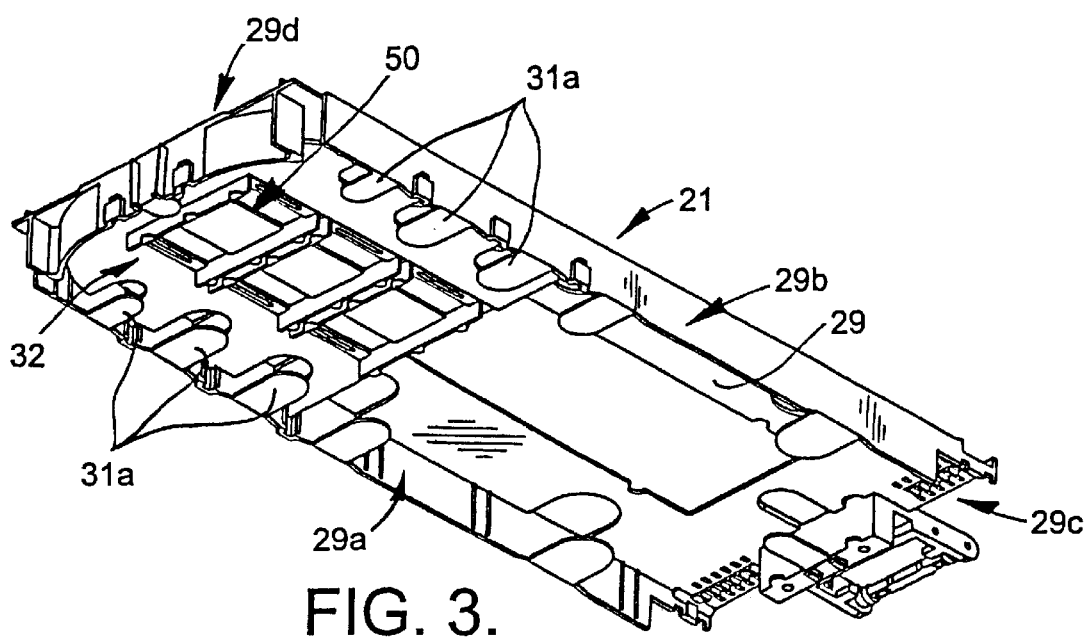
FIG. 3 is a rear perspective view of the fiber optic splice organizer of FIG. 2.

A completed fiber optic splice closure 20 used for butt splicing is shown in FIG. 1 with the fiber optic splice organizer 21 according to the present invention shown installed within a protective housing 22. The fiber optic splice closure 20 would have portions of two fiber optic cables entering through an opening 24 in an end cap 26 of the organizer 21. The protective housing 22 is sealed to the end cap 26 after the splicing operation is completed. A mounting bracket 27 secures the splice organizer 21 to the end cap 26, and a cable terminator 23, such as in the form of conventional strain relief clamps as described in the above-identified U.S. Pat. No. 5,323,480, could be used. The fiber optic splice closure 20 could be installed aerially along a pole line, in a manhole, directly buried in the ground, and in other locations as would be understood by those skilled in the art. As will also be readily appreciated by those skilled in the art, the present invention could be used in other splice configurations, such as an in-line splice, wherein a pair of fiber optic cables enters the housing through respective opposing end caps. Other details of the closure 20 and the type of components used can be found in the above-identified, incorporated by reference U.S. Pat. No. 5,323,480.

A plurality of fiber optic splice organizers 21 are pivotally connected at one end to the mounting bracket 27, which in turn, is connected to the inside face of the end cap 26 of the fiber optic splice closure. The plurality of fiber optic splice organizers 21 are moveable between a stacked position and a raised position to facilitate access to an underlying splice organizer.

The optical fibers from incoming optical fiber cables can be carried by flexible transport tubes (not shown) to respective fiber optic splice organizers. Any transport tubes must be sufficiently flexible to permit the splice trays to be moved between the stacked and raised positions, and still be sufficiently rigid to prevent more sharply bending the optical fibers than the desired minimum bend radius. Further details of the transport tubes and how they can be designed are disclosed in the above-identified incorporated by reference U.S. Pat. No. 5,323,480. As noted before, the fiber optic cable is terminated on the housing and includes a guide member for guiding optical fibers in strands onto the fiber optic splice organizer 21.

The fiber optic splice organizer 21 includes a generally longitudinally extending lower base member 29 on which slack optical fibers can be stored. The lower base member 29 includes lengthwise extending first and second opposing sides having the designation 29a and 29b, with each side corresponding to respective a and b sides, and widthwise extending first and second opposing ends 29c and 29d. One end 29c of the lower base member 29 includes a hinge 30 that allows the fiber optic splice organizer 21 to be pivotally mounted on the mounting bracket 27 that is positioned against the end cap 26 of the housing 22. Further details of a pivotal mount are disclosed in the above-identified and incorporated by reference U.S. Pat. No. 5,323,480.

The lower base member 29 is generally rectangular configured and includes a pair of opposing sidewalls 31 that extend upwardly from the lower base member for retaining slack portions of optical fibers adjacent thereto. Guide tabs 31a extend from the sidewalls 31 across a portion of the lower base member to aid in retaining slack portions of optical fibers within the lower base member. The upper end 29d also includes an end wall 29e against which fiber optic cable can be positioned.

Figure 6:
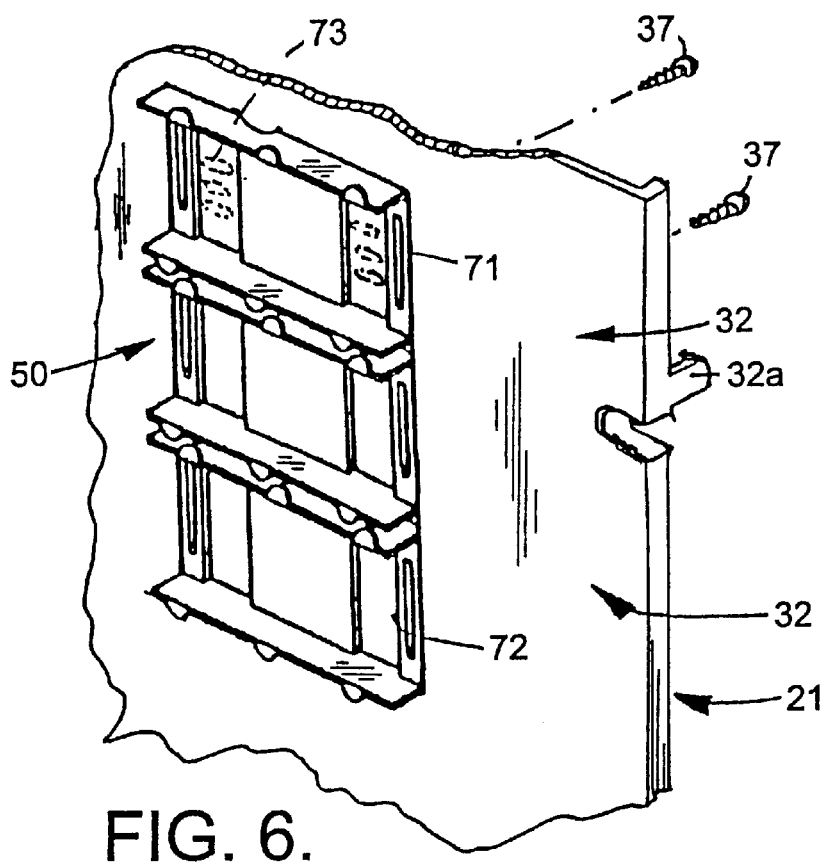
FIG. 6 is an exploded perspective view of a medial portion of the upper splice tray according to the present invention as shown in FIG. 1, and illustrating a locking tab.

An upper splicing tray 32 is positioned on the lower base member, and typically is snap fit onto the lower base member by at least one locking member 32a that permits the upper splicing tray to snap fit onto the lower base member as shown by the locking member 32a in FIG. 6. However, a snap fit is not required and the fiber optic splice organizer can be designed such that the upper tray is formed integral with the lower base member. Guide tabs 31a extend across from the sidewalls of the lower base member, and as illustrated, across the upper splicing tray 32 to aid in retaining slack portions of optical fibers within the lower base member to aid in retaining the splice cable components from extending out from the upper splicing tray. The optical fibers could also be grouped together by retainer fasteners (not shown), which act to bundle groups of fibers together. The upper splicing tray 32 is also substantially rectangular configured.

Figure 4:
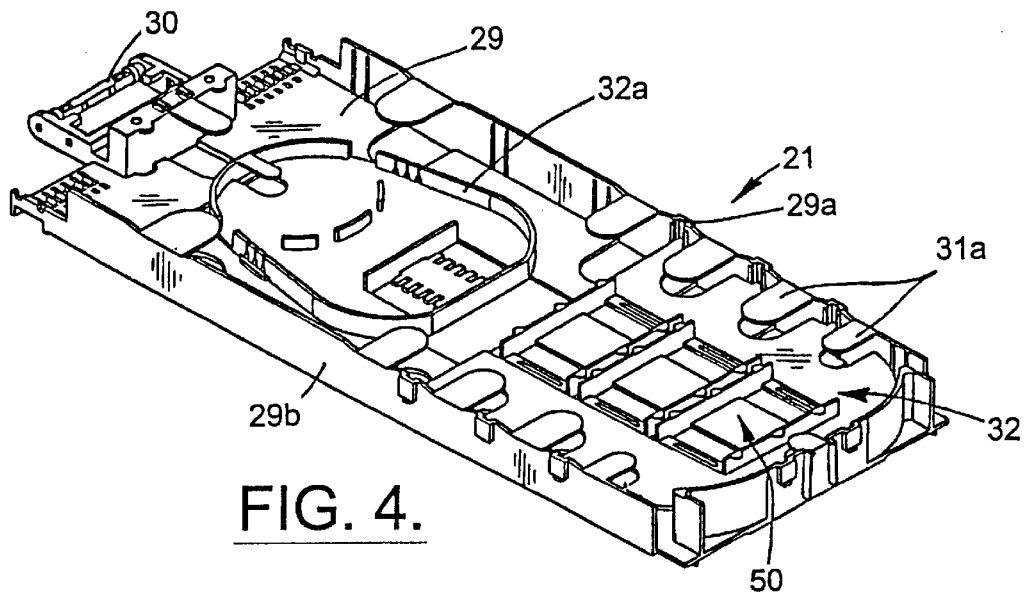
FIG. 4 is another top perspective view of the fiber optic splice organizer of FIG. 2 with a separator wall.
Figure 5:
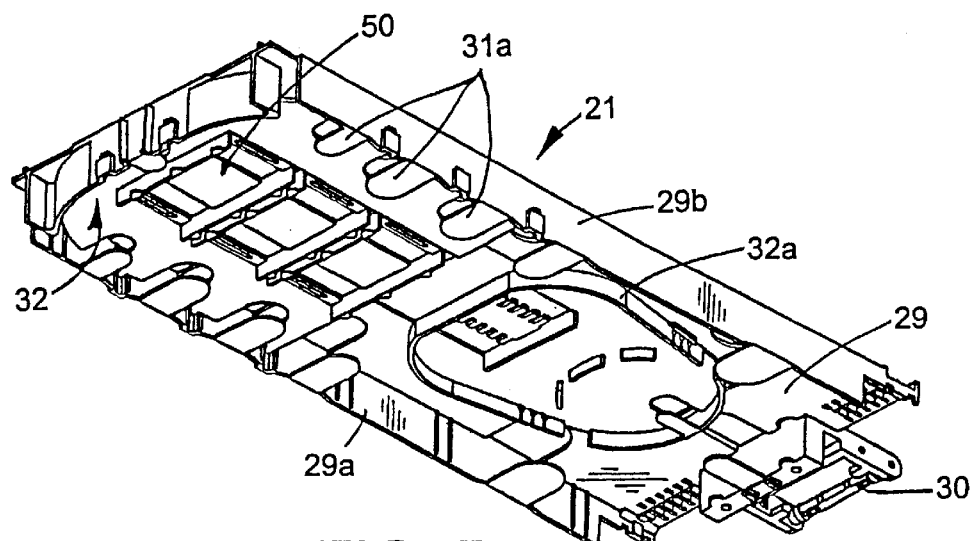
FIG. 5 is a rear perspective view of another embodiment of the fiber optic splice organizer of FIG. 4.

In one aspect of the present invention, the upper splicing tray 32 is secured to the lower base member at the end opposite the end that is pivotally mounted to the mounting bracket 27. In still another aspect of the present invention, the upper splicing tray 32 could be secured to the lower base member 29 at a medial portion of the lower base member and even closer to the bracket. The splice holder can be adapted for splicing ribbon fiber optic cable and for in-line splicing. In the structure shown in FIGS. 1, 4 and 5, a separator wall 32a is formed to retain slack fiber optic cable. It is arcuately configured as is well known to those skilled in the art.

Figure 7:
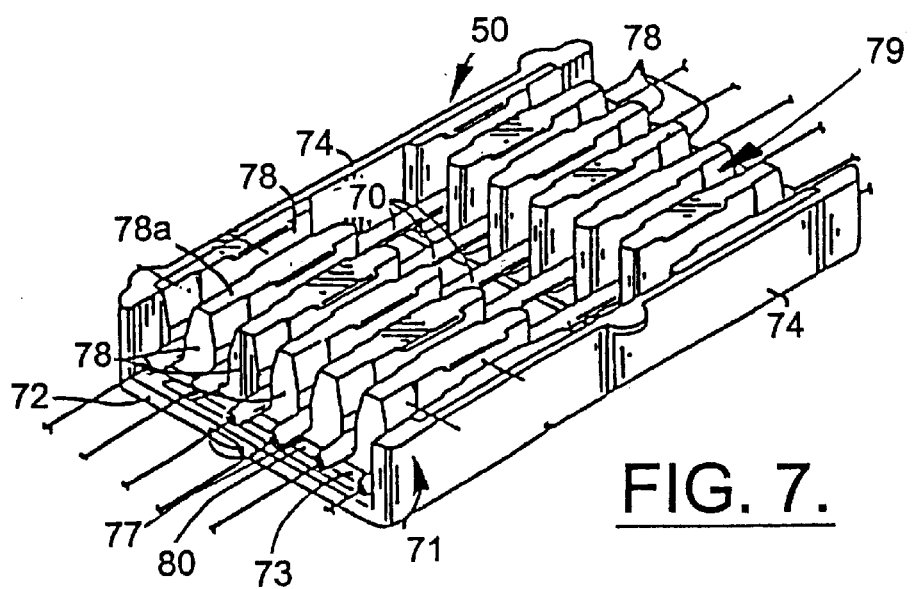
FIG. 7 is a perspective view of one type of splice holder that would be used according to the present invention.

In one aspect of the present invention, optical fiber can be spliced and then supported by a splice holder 50 on the upper splice tray by the structure shown in FIGS. 6 and 7. The splice holder can be adapted for splicing ribbon.

As would be readily understood by those skilled in the art, a conventional splice holder typically secures several splices in side-by-side relation. The splice holder must securely hold the splices and prevent damage thereto such as caused by mechanical shock and vibration. The splice holder 50 accommodates a variety of different manufacturers splices with different external dimensions. In addition, the splice holder 50 protects the splices from shock and vibration. Many different splice holders could be used as suggested by those skilled in the art.

The splice holder 50 in this particular example includes a generally rigid shell 71 having a predetermined pattern of openings 73 in a base portion 72 of the shell. The shell 71 also includes a pair of opposing spaced apart side walls 74. A pair of flexible inserts 77 is positioned in the shell 71 so that a series of spaced apart walls 78, extending outwardly from a base 80 of the inserts 77, passes through the corresponding openings 73 in the base portion 72 of the shell 71. The walls 78, 78a and the base 80 of the inserts 77 of the illustrated embodiment are integrally molded of a flexible rubber material. Accordingly, the generally rigid shell 71 serves to support and stabilize the flexible inserts 77 on a splice tray.

As explained in further detail in the above-identified U.S. Pat. No. 5,323,480, the flexible walls 78, 78a of the inserts 77 define a series of channels 79 for receiving therein respective optical fiber splices 70. The outermost walls 78a of the inserts 77 at the peripheral opposing sides of the base 80 are solid walls of about half the thickness of the interior walls 78. The side walls 74 of the shell 71 serve to prevent the outermost walls 78a from bowing outwardly an undesired amount when splices are positioned in the channels 79 adjacent the outermost walls 78a.

The flexible inserts 77 can preferably be formed of injection moldable rubber, that is, non cross-linked, non-vulcanized rubber as would be readily known to those skilled in the art. The injection moldable rubber permits the inserts 77 to be readily injection molded and then subsequently removed from the mold despite the overhanging projections on the tops of flexible walls 78, 78a. The projections further serve to secure different sized splices 70 in the respective channels 79.

The flexible walls 78 of the inserts 77 can include a hollow cavity extending through a substantial portion thereof vertically from the base 80 to near the top of the wall 78. The hollow cavity permits a wider range of sizes of splices 70 to be positioned within the channels 79 and also provides enhanced cushioning and shock absorbing for the splices, especially as compared to a solid wall of a resilient material, for example.

In operation, optical fiber splices can be formed between first and second optical fiber groups. The optical fiber splices can first be formed and then positioned on the medial portion of the upper splicing tray 32. The slack fiber optic cable can be coiled and a portion of the coiled slack optical fibers can be placed under the upper splicing tray. The portion of the slack optical fibers that have not been inserted under the upper splicing tray 32 can be guided along respective portions of the lower base member adjacent the upwardly extending walls of the first and second sides. The operator typically secures the slack fiber optic cable under the guide tabs 31a that extend from the sidewalls across a portion of the lower base member. The slack fiber optic cable can be coiled into and around the separator wall.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A fiber optic splice organizer for securing a plurality of optical fiber splices and for securing slack associated therewith comprising:

a generally longitudinally extending lower base member on which slack optical fiber cbe stored, said lower base member further comprising lengthwise extending first and second opposing sides and widthwise extending first and second opposing ends;

means mounted at one of the ends for pivotally mounting said base member to a housing of a fiber optic splice closure;

a guide for receiving optical fiber onto the lower base member at the end to be pivotally mounted;

upper splicing tray secured on said lower base member; and at least one splice holder positioned on said upper splicing tray for securing a plurality of fiber optic splices in side-by-side relation, wherein a portion of slack optical fiber can be stored under the upper splicing tray.

2. A fiber optic splice organizer according to claim 1, wherein said fiber optic splice organizer further comprises a guide for receiving and guiding groups of optic fibers.

3. A fiber optic splice organizer according to claim 1, wherein said lower base member is generally rectangular configured and includes a pair of opposing sidewalls extending upwardly from said lower base member for retaining slack portions of optical fibers adjacent thereto.

4. A fiber optic splice organizer according to claim 1, and further comprising sidewalls and guide tabs extending from said sidewalls across a portion of said lower base member to aid in retaining slack portions of optical fibers within the lower base member.

5. A fiber optic splice organizer according to claim 1, wherein said upper splicing tray includes at least one locking member that permits said upper splicing tray to snap fit to said lower base member.

6. A fiber optic splice organizer according to claim 1, wherein said upper splicing tray is substantially rectangular configured.

7. A fiber optic splice organizer according to claim 1, wherein said upper splicing tray is secured to said lower base member at the end opposite the end to be pivotally mounted.

8. A fiber optic splice organizer according to claim 1, wherein said upper splicing tray is secured to said lower base member at a medial portion of said lower base member.

9. A fiber optic splice organizer according to claim 1, wherein said splice holder is adapted for splicing ribbon optical fibers.

10. A fiber optic splice organizer according to claim 1, wherein said spice holder is adapted for in-line splicing.

11. A fiber optic splice organizer for securing a plurality of optical fiber splices between first and second optical fiber groups and for securing slack associated therewith comprising:
a generally rectangular configured, longitudinally extending lower base member that has lengthwise extending first and second opposing sides and widthwise extending first and second opposing ends on which slack optical fibers cbe stored in looped configuration;
a pair of opposing sidewalls extending upwardly from the lower base member for retaining slack portions of the optical fibers adjacent first and second opposing sides;
a hinge member positioned at one end for pivotally mounting the base member to housing of a fiber optic splice closure;
a guide positioned at the end having the hinge member for receiving optical fibers;
an upper splicing tray positioned on said lower base member; and
at least one splice holder secured on said upper splicing tray for securing a plurality of fiber optic splices in side-by-side relation, wherein a portion of slack optical fiber can be stored under the upper splicing tray on said lower base member.

12. A fiber optic splice organizer according to claim 11, and further comprising guide tabs extending from said sidewalls to aid in retaining slack portions of optical fibers within the lower base member.

13. A fiber optic splice organizer according to claim 11, wherein said upper splicing tray includes at least one locking member that permits said upper splicing tray to snap fit onto said lower base member.

14. A fiber optic splice organizer according to claim 11, wherein said upper splicing tray is substantially rectangular configured.

15. A fiber optic splice organizer according to claim 11, wherein said upper splicing tray is secured to said lower base member at the end opposite the hinge member.

16. A fiber optic splice organizer according to claim 11, wherein said upper splicing tray is secured to said lower base member at a medial portion of said lower base member.

17. A fiber optic splice organizer according to claim 11, wherein said splice holder is adapted for splicing ribbon optical fibers.

18. A fiber optic splice organizer according to claim 11, wherein said spice holder is adapted for in-line splicing.

19. A fiber optic splice closure comprising:
a housing;
means for securing at least one fiber optic cable to the housing;
a plurality of fiber optic splice organizers each pivotally mounted to said housing for securing a plurality of optical fiber splices between first and second optical fiber groups and for securing slack associated therewith, said fiber optic splice organizers being positioned within said housing and each having an end pivotally connected to said housing and movable between a stacked position and raised position to facilitate access to an underlying fiber optic splice organizer wherein each fiber optic splice organizer further comprises,
a generally longitudinally extending lower base member that has lengthwise extending first and second opposing sides and widthwise extending first and second opposing ends on which slack fiber optic cable can be stored in looped configuration;
a hinge positioned at the pivotally mounted end and pivotally mounting the lower base member to the housing;
a guide positioned at the pivotally connected end of the base member for receiving optical fibers;
an upper splicing tray secured on said lower base member; and
at least one splice holder positioned on said upper splicing tray for securing a plurality of fiber optic splices in side-by-side relation, wherein a portion of slack optical fiber can be stored under the upper slicing tray on said lower base member.

20. A fiber optic splice closure according to claim 19, wherein said fiber optic splice organizer further comprises a guide member for receiving and guiding groups of optical fibers.

21. A fiber optic splice closure according to claim 19, wherein said fiber optic splice organizers each comprises a generally rectangular configured lower base member and a pair of opposing sidewalls extending upwardly from said lower base member for retaining slack portions of optical fibers adjacent thereto.

22. A fiber optic splice closure according to claim 21, and further comprising guide tabs extending from said sidewalls across a portion of said lower base member to aid in retaining slack portions of optical fibers within the lower base member.

23. A fiber optic splice closure according to claim 19, wherein said housing is generally cylindrically configured.

24. A fiber optic splice closure according to claim 19, and further comprising cable termination means connected to said housing for securing one or more fiber optic cables thereto.

25. A fiber optic splice closure according to claim 19, wherein said upper splicing tray includes at least one locking member that permits said upper splicing tray to snap fit to said lower base member.

26. A fiber optic splice closure according to claim 19, wherein said upper splicing tray is substantially rectangular configured.

27. A fiber optic splice closure according to claim 19, wherein said upper splicing tray is secured to said lower base member at the end opposite the hinge.

28. A fiber optic splice closure according to claim 19, wherein said upper splicing tray is secured to said lower base member at a medial portion of said lower base member.

29. A fiber optic splice closure according to claim 19, wherein said splice holder is adapted for splicing ribbon optical fibers.

30. A fiber optic splice closure according to claim 19, wherein said spice holder is adapted for in-line splicing.

31. A method for organizing a plurality of optical fiber splices between first and second optical fiber groups and the slack associated therewith on a lower base member having lengthwise extending first and second opposing sides, opposing sidewalls extending upwardly from the base, and widthwise extending first and second opposing ends, the method comprising the steps of:

securing optical fiber splices that exist between first and second optical fiber groups on splice holders that are positioned on a medial portion of an upper splicing tray that is secured to the lower base member;

coiling the optical fibers;

inserting a portion of the coiled slack optical fiber under the upper splicing tray; and guiding the portion of the slack optical fibers that have not been inserted under the upper splicing tray along respective portions of the lower base member adjacent the upwardly extending walls of the first and second sides.

32. A method according to claim 31, and further comprising the step of securing the slack optical fibers under guide tabs that extend from the sidewalls across a portion of the lower base member.

33. A method according to claim 31, and further comprising the step of coiling the slack optical fibers into a figure eight loop.

34. A method according to claim 31, and further comprising the step of mounting the splice holder adjacent the first end of the lower base member and securing the first and second optical fiber groups in laterally spaced apart relation on the lower base member adjacent the first end of the lower base member prior to splicing.

35. A fiber optic splice organizer for securing a plurality of optical fiber splices and for securing slack associated therewith comprising:

a generally longitudinally extending lower base member on which slack optical fiber and single splices can be stored, said lower base member further comprising lengthwise extending first and second opposing sides and widthwise extending first and second opposing ends;

means mounted at one of the ends for pivotally mounting said base member to a housing of a fiber optic splice closure;

an upper splicing tray secured on said lower base member; and at least one splice holder positioned on said upper splicing tray for securing ribbon fiber optic splices in side-by-side relation, wherein a portion of slack optical fiber can be stored under the upper splicing tray on said lower base member.

36. A fiber optic splice organizer according to claim 35, wherein said fiber optic splice organizer further comprises a guide for receiving and guiding groups of optic fibers.

37. A fiber optic splice organizer according to claim 35, wherein a portion of slack optical fiber can be stored under the upper slicing tray.

38. A fiber optic splice organizer according to claim 35, wherein said lower base member is generally rectangular configured and includes a pair of opposing sidewalls extending upwardly from said lower base member for retaining slack portions of optical fibers adjacent thereto.

* * * * *